United States Patent
Chen et al.

(10) Patent No.: US 11,929,624 B2
(45) Date of Patent: Mar. 12, 2024

(54) MODULE-SHARED FLEXIBLE LOOP CLOSING CONTROLLER TOPOLOGY FOR POWER GRID

(71) Applicant: SOUTHEAST UNIVERSITY, Nanjing (CN)

(72) Inventors: Wu Chen, Nanjing (CN); Guohao He, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 155 days.

(21) Appl. No.: 17/639,439

(22) PCT Filed: Jun. 23, 2021

(86) PCT No.: PCT/CN2021/101743
§ 371 (c)(1),
(2) Date: Mar. 1, 2022

(87) PCT Pub. No.: WO2022/033185
PCT Pub. Date: Feb. 17, 2022

(65) Prior Publication Data
US 2022/0302714 A1 Sep. 22, 2022

(30) Foreign Application Priority Data
Aug. 11, 2020 (CN) .......................... 202010801092.9

(51) Int. Cl.
*H02J 3/46* (2006.01)
*H02M 5/458* (2006.01)

(52) U.S. Cl.
CPC ............. *H02J 3/46* (2013.01); *H02M 5/4585* (2013.01); *H02J 2203/10* (2020.01)

(58) Field of Classification Search
CPC .. H02J 3/46; H02J 2203/10; H02J 3/26; H02J 2203/20; H02J 2300/40; H02J 3/466;
(Continued)

(56) References Cited

U.S. PATENT DOCUMENTS

2021/0188106 A1* 6/2021 Asa ........................ H02M 5/297

FOREIGN PATENT DOCUMENTS

CN 106786722 5/2017
CN 107123980 9/2017
(Continued)

*Primary Examiner* — Richard Tan
(74) *Attorney, Agent, or Firm* — Treasure IP Group, LLC

(57) ABSTRACT

The invention discloses a power network flexible controller topology shared by modules. Each single-phase topology comprises an AC/AC converter including $N_1$ CHB modules, and an AC/DC module including $N-N_1$ full-bridge rectifiers; the AC input terminals of $N_1$ CHB modules are connected in series to form an AC port on one side of the AC/AC converter, the AC output terminals of $N_1$ CHB modules are connected in series to form the AC port on the other side of the AC/AC converter, the AC input terminals of $N-N_1$ full-bridge rectifiers are connected in series to form the AC port of the AC/DC module, the AC port on one side of the AC/AC converter is connected in series with the AC side port of the AC/DC module and then connected to a first AC network nd the AC port on the other side of the AC/AC converter is connected in series with the DC side port of the AC/DC module.

8 Claims, 6 Drawing Sheets

(58) Field of Classification Search
CPC ...... H02J 3/00; H02J 3/06; H02J 3/36; H02M 5/4585; H02M 1/0077; H02M 3/33584; H02M 5/225; H02M 7/4835; H02M 1/0074; H02M 3/33576
USPC .......................................................... 307/18
See application file for complete search history.

(56) References Cited

FOREIGN PATENT DOCUMENTS

| | | |
|---|---|---|
| CN | 107769239 | 3/2018 |
| CN | 111245254 | 6/2020 |
| CN | 112072639 | 12/2020 |

* cited by examiner

MODULE-SHARED FLEXIBLE LOOP CLOSING CONTROLLER TOPOLOGY FOR POWER GRID

CROSS-REFERENCE TO RELATED APPLICATIONS

This Application is a Section 371 National Stage Application No. PCT/CN2021/101743, filed on Jun. 23, 2021, and claims priority to Chinese Patent Application No. 202010801092.9, filed on Aug. 11, 2020, the contents of which are incorporated herein by reference in their entireties.

TECHNICAL FIELD

The invention relates to a flexible controller technology, in particular to a power network flexible controller topology structure shared by modules, and belongs to the technical field of power generation, power transformation or power distribution.

BACKGROUND

With the transformation of the global energy structure, the rapid increase in the proportion of renewable energy sources such as wind energy, solar energy, etc. has resulted in an increase in distributed power sources in a distribution network, and the structure of a distribution network system has become increasingly complex. In addition, the problems such as voltage out-of-limit, complex power flow direction, etc. in the distribution network led to the reduction of power supply reliability and power quality. At present, the nodes of the distribution network are mainly connected by a traditional mechanical switch. Due to the limitation of switching loss, impulse current, etc., the traditional mechanical switch is difficult meet the requirements of the future power distribution network because the switch cannot be frequently turned on/off according to the actual situation.

As a kind of electric and electronic device connected to a distribution line, the flexible controller has gradually become a hot spot in the field of distribution network. Compared with traditional mechanical switch, the flexible controller can not only replace the mechanical switch with on and off states, but also is not limited by the number of switching actions, and has the advantages such as controllable power flow, flexible switching mode of operation, multiple control modes, etc.

In terms of the flexible controller, most of the domestic and foreign research schemes draw on the modular multi-level converter (MMC) conversion scheme of a back-to-back structure in flexible direct current transmission. MMC has been widely used because of its modularity, easy expansion, and good output harmonic performance. However, the MMC-based flexible controller has a large number of modules and disadvantages such as complex control, high cost, large volume, and adoption of a common DC side, thus reducing the safety of the device.

The invention patent with publication number CN106786722A proposes a flexible closed-loop device with a CHB-based star-shaped, triangular and hybrid topology structure. CHB has the MMC's advantages such as modularity and easy expansion, and the cost and volume of CHB have certain advantages over MMC. Moreover, the modules of CHB do not use the same DC bus, so the DC side control method is simple. However, the topology uses many high-frequency transformers, occupies a large volume, and all power transmission passes through the isolation level, resulting in a low efficiency.

SUMMARY OF THE INVENTION

The purpose of the invention is to provide a power network flexible closed-loop controller topology shared by modules aiming at the deficiencies of the above-mentioned background technology, so as to meet the requirements of the distribution network for the flexible controller. The flexible closed-loop controller disclosed by the invention can connect two distribution network nodes with a small voltage level and phase angle difference, so as to realize the power flow control of the distribution network and improve the power quality and power supply reliability. The invention solves the technical problem that the existing flexible closed-loop controller realizes the interconnection of distribution network nodes at the cost of reducing efficiency and increasing cost.

In order to achieve the above purpose, the invention uses the following technical scheme.

The controller proposed by the invention is a power network flexible controller topology shared by modules, and two ports are respectively connected with a three-phase AC network. Each single-phase topology includes: an AC/AC converter including $N_1$ CHB modules, and an AC/DC module including $N-N_1$ full-bridge rectifiers; the AC input terminals of $N_1$ CHB modules are connected in series to form an AC port on one side of the AC/AC converter, the AC output terminals of $N_1$ CHB modules are connected in series to form the AC port on the other side of the AC/AC converter, the AC input terminals of $N-N_1$ full-bridge rectifiers are connected in series to form the AC port of the AC/DC module, the AC port on one side of the AC/AC converter is connected in series with the AC side port of the AC/DC module and then connected to a first AC network $U_{g1}$, the AC port on the other side of the AC/AC converter is connected in series with the DC side port of the AC/DC module and then connected to a second AC network $U_{g2}$, and the AC incoming line and AC outgoing line of the three-phase topology are connected to the AC network in a star connection mode, where N and $N_1$ are a positive integer. The AC/AC converter including $N_1$ CHB modules is a non-shared module, and the AC/DC module including $N-N_1$ full-bridge rectifiers is a shared module. The full-bridge rectifier in the shared module and the full-bridge rectifier in the non-shared module share the AC voltage on side A. The full-bridge rectifier in the shared module and the full-bridge inverter in the non-shared module jointly transmit the energy received from side A to the AC network on side B. Denote the voltage at the input end and output end of the non-shared module as $U_1$ and $U_2$ respectively, and the voltage at the input end of the shared module as $U_3$. $U_1+U_3$ is the voltage at the port where the single-phase topology is connected to the AC network on side A, and $U_2+U_3$ is the voltage at the port where the single-phase topology is connected to the AC network on side B. The three-phase topology has $3N+9N_1$ full-bridge converters and $3N_1$ high frequency transformers in total.

Further, the AC/AC converter is realized by a module based on a cascaded H-bridge, and specifically includes two full-bridge converters and a high-frequency isolation unit connected between the two full-bridge converters.

Further, each high-frequency isolation unit is a dual active bridge DC/DC converter (DAB), and includes the full-bridge converters on both sides and a high-frequency isolation transformer in the middle; the high-frequency isolation transformer forms the DC link in the AC/AC converter, and the ports connecting the high-frequency isolation unit with the full-bridge converter and the full-bridge rectifier are all connected with a capacitor.

Further, the AC/DC module also includes a power frequency transformer, the input end of each CHB module is connected in series with the primary coil of the power frequency transformer and then connected to the AC network on side A, the output end of each CHB module is connected in series with the primary coil of the power frequency transformer and then connected to the AC network on side B, the primary coil of the power frequency transformer and the input end of the CHB module share the alternating current generated by the AC network on side A, and the primary coil of the power frequency transformer and the output end of the CHB module jointly transmit the energy received from side A to the AC network on side B. The three-phase topology has $12N_1+3N_2$ full-bridge converters, $3N_1$ high frequency transformers, and 1 power frequency transformer in total.

Using the above technical scheme, the invention has the following beneficial effects:

(1) Take the power network flexible controller topology shared by modules based on the cascaded H-bridge as an example. When the requirements for the number of shared and non-shared modules are met and the number of full bridges of the shared module is large enough, the module can support most of the voltage of the network at the two ports, and the current flowing into the shared module is very small.

(2) When the number of full bridges of the non-shared module is small, the voltage at the isolation level port is not high; compared with the previous flexible closed-loop controller, in the case of the unchanged total power transmission, the isolation module can transmit less power and reduce power loss, thereby increasing the transmission efficiency of the entire flexible control switch.

(3) Compared with an ordinary three-phase CHB structure, the power network flexible controller topology shared by modules based on the cascaded H-bridge in the invention saves $9(N-N_1)$ full bridges and $3(N-N_1)$ high frequency transformers, which can greatly save cost and equipment volume.

(4) The relationship between the number of full bridges of the non-shared module and the number of full bridges of the shared module and the relationship between the DC side voltage and the AC side voltage have much room for optimization in different cases.

(5) The AC/AC module can have a variety of solutions, thus having a large space for development.

Figure 1:
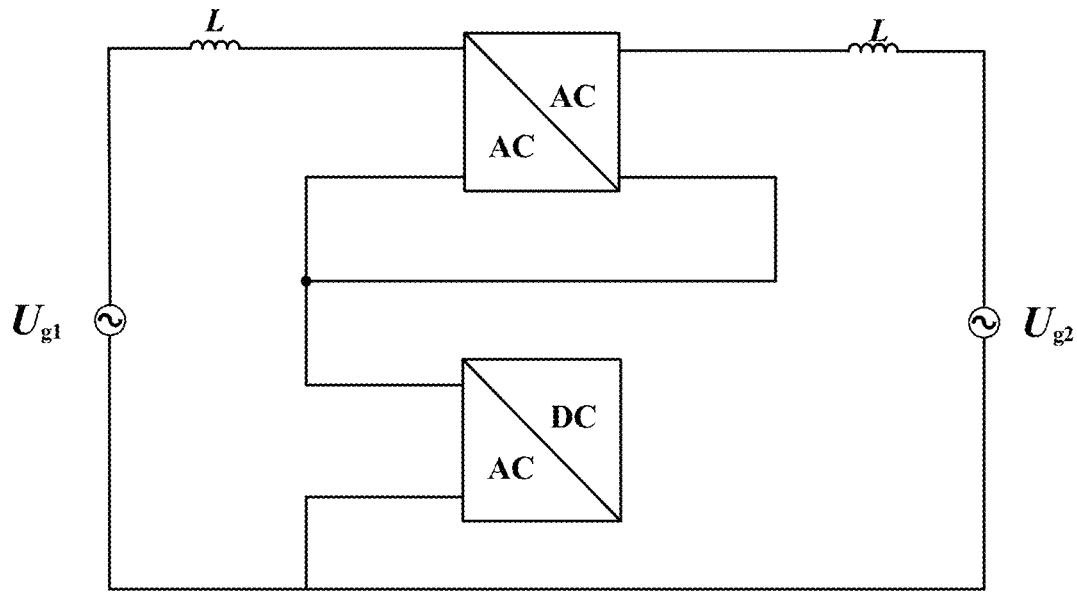
FIG. 1 is the single-phase structure diagram of a power network flexible controller topology shared by modules of the invention.

Description of the tag numbers in the drawings: 1. Full bridge rectifier, 2. High frequency isolation unit, 3. Full bridge inverter, and 4. Full bridge rectifier.

DETAILED EMBODIMENTS

According to the drawings, the technical scheme of the invention is described below in detail.

Figure 4:
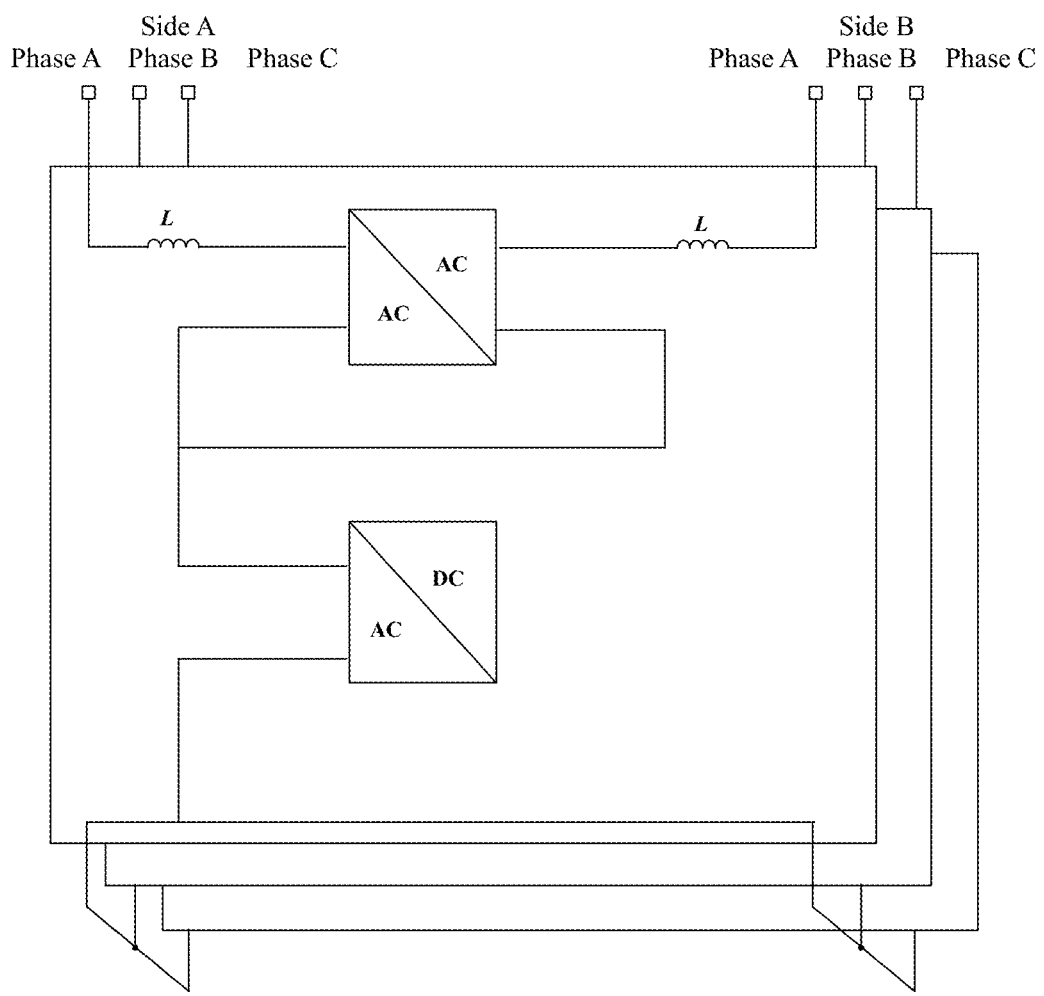
FIG. 4 is the three-phase star connection structure diagram of the power network flexible controller topology shared by modules of the invention.
Figure 6:
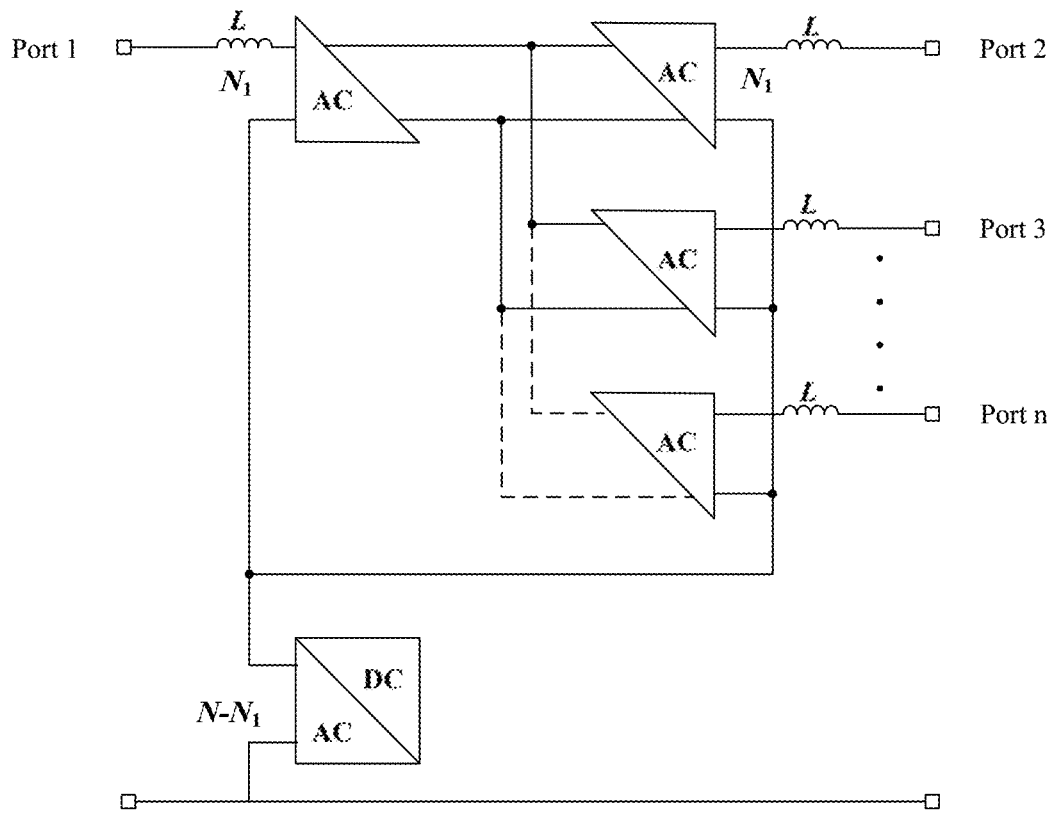
FIG. 6 is the single-phase structure diagram of the power network flexible multi-port topology shared by modules of the invention.

A power grid flexible controller topology shared by modules disclosed by the invention is shown in FIG. 4, and includes A phase, B phase, C phase. As shown in FIG. 1, each single-phase topology is a dual-port module connected between $U_{g1}$ and $U_{g2}$ networks, including the AC/AC converter of the non-shared module and the AC/DC module of the shared module. The AC port on one side of the AC/AC converter is connected in series with the AC side port of the AC/DC module and then connected to the AC network $U_{g1}$, the AC port on the other side of the AC/AC converter is connected in series with the DC side port of the AC/DC module and then connected to the AC network $U_{g2}$, and the AC incoming line and AC outgoing line of the AC/AC converter are connected with an inductance $L$. The incoming line or outgoing line of each port of the three-phase topology is connected to the AC network in a star connection mode, and the power network flexible controller topology is applicable to the connection of the distribution network where the voltage amplitude and phase angle difference between the two ports are small. The AC/AC converter can also be achieved by using the module with one input terminal and multiple output terminals as shown in FIG. 6; accordingly, the power network flexible controller topology also has multiple output terminals.

Figure 2:
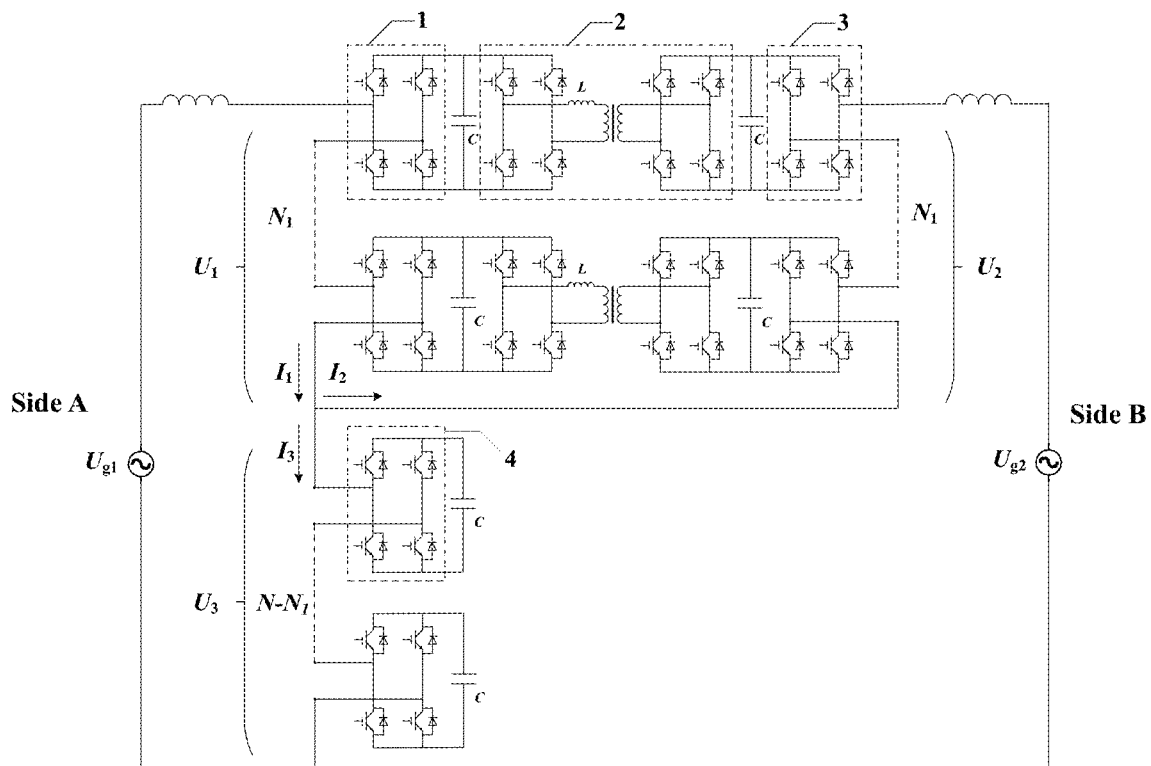
FIG. 2 is the single-phase structure diagram of the power network flexible controller topology shared by CHB-based modules of the invention.
Figure 5:
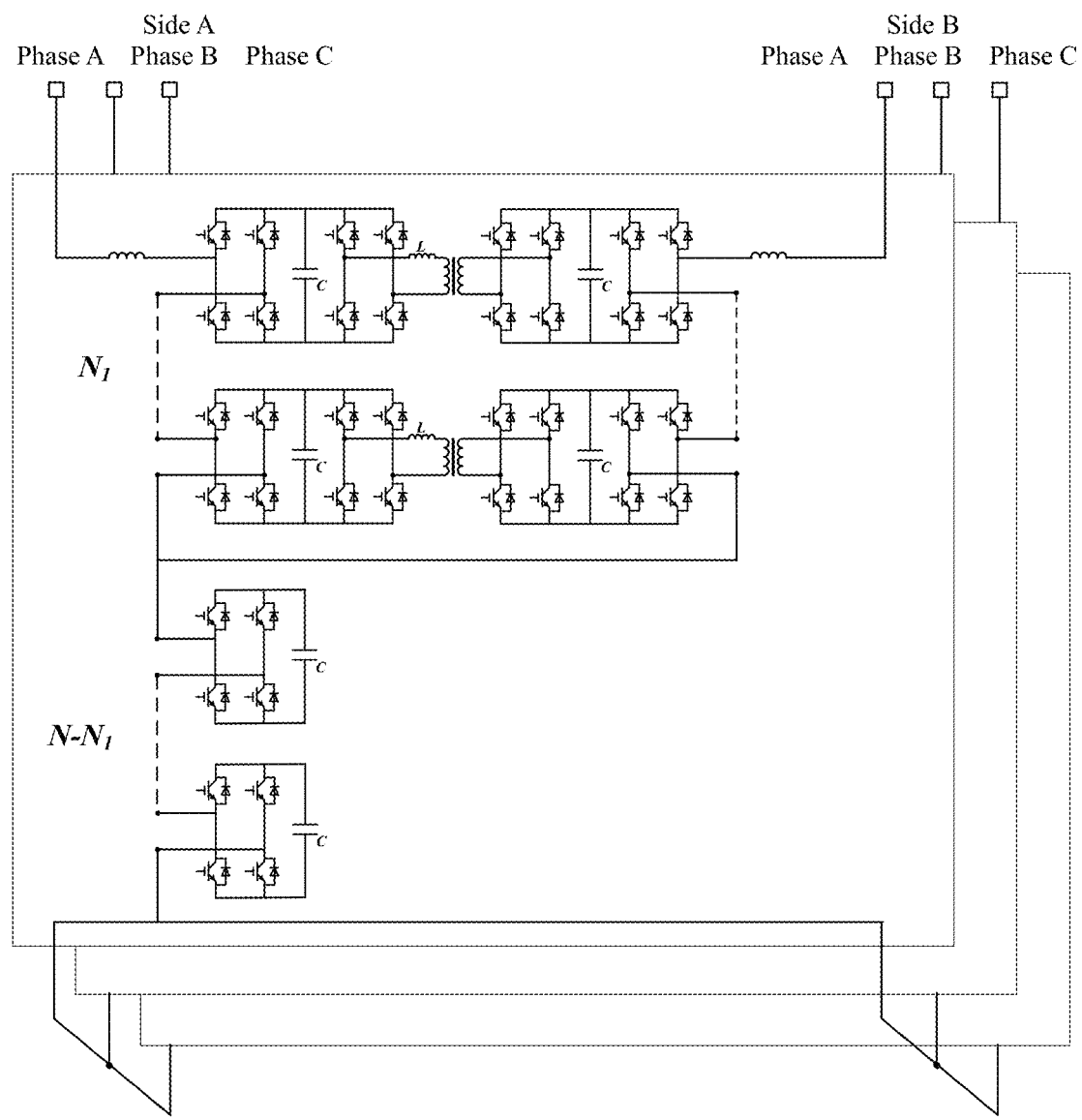
FIG. 5 is the three-phase star connection structure diagram of the power network flexible controller topology shared by CHB-based modules of the invention.

The single-phase structure of a power network flexible controller topology shared by CHB-based modules is shown in FIG. 2. The two ports of the single-phase structure are respectively connected to the AC network $U_{g1}$ on side A and the AC network $U_{g2}$ on side B, including a non-shared module composed of $N_1$ CHB modules, and a shared module composed of $N-N_1$ full-bridge rectifiers 4, Each CHB module includes a full-bridge rectifier 1, a high-frequency isolation unit 2, and a full-bridge inverter 3 connected in sequence. The AC ports of $N_1$ full-bridge rectifiers 1 are connected in series to form the input end of the non-shared module, the AC ports of $N_1$ full-bridge inverters 3 are connected in series to form the output end of the non-shared module, the AC ports of $N-N_1$ full-bridge rectifiers 4 are connected in series to form the input end of the shared module, the input end of the non-shared module is connected in series with the input end of the shared module and then connected to the AC network $U_{g1}$ on side A, and the output end of the non-shared module is connected in series with the input end of the shared module and then connected to the AC network $U_{g2}$ on side B. Denote the voltage at the input end and output end of the non-shared module as $U_1$ and $U_2$ respectively, and the voltage at the input end of the shared module as $U_3$. $U_1+U_3$ is the voltage at the port where the single-phase topology is connected to the AC network on side A, and $U_2+U_3$ is the voltage at the port where the single-phase topology is connected to the AC network on side B. The high-frequency isolation unit 2 is a dual active bridge DC/DC converter, including two full-bridge converters and a high-frequency isolation transformer connected between the full-bridge converters; the two ports of the high-frequency isolation unit 2 are connected with a capacitor C in parallel. As shown in FIG. 5, the three-phase topology has $3N+9N_1$ full-bridge converters and $3N_1$ high frequency transformers in total. The three-phase topology cannot achieve delta connection and hybrid connection due to the same ground wire, so the topology is connected to the AC network in star connection mode.

Figure 3:
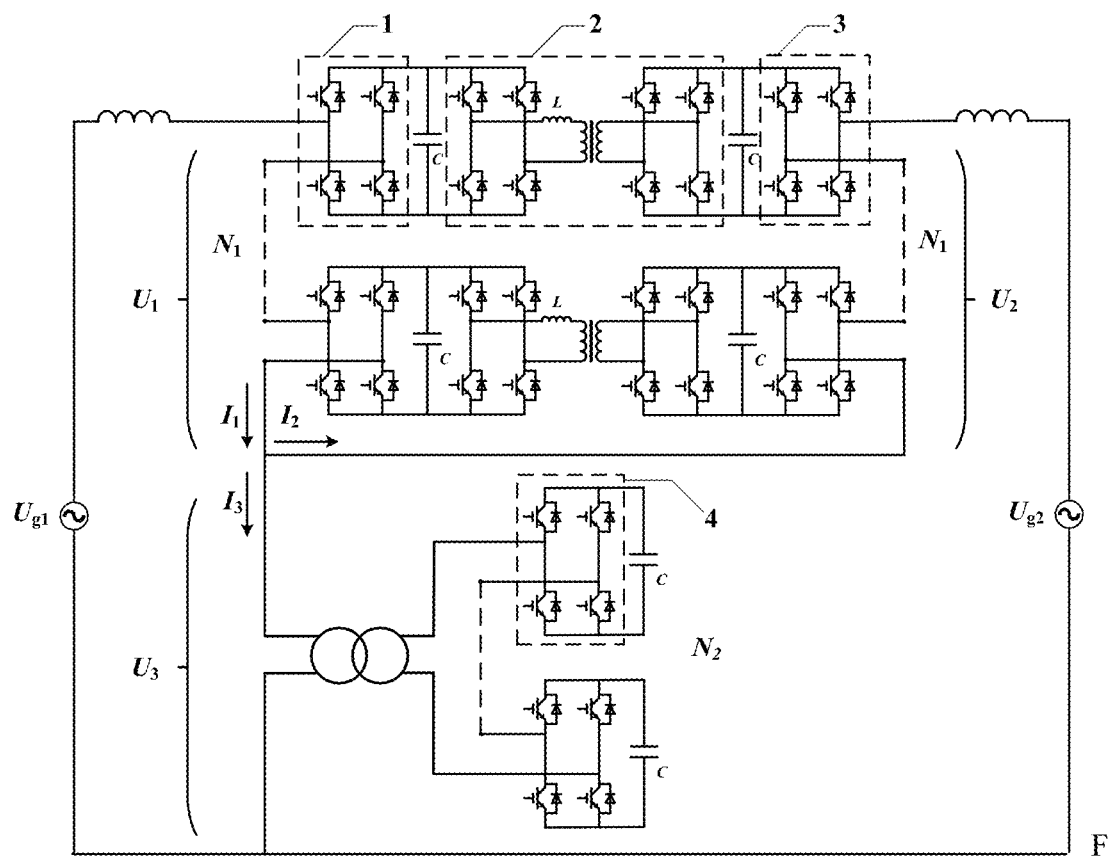
FIG. 3 is the single-phase structure diagram of the power network flexible controller topology shared by modules based on a power frequency transformer of the invention.

The single-phase structure of a power network flexible controller topology shared by modules based on a power frequency transformer is shown in FIG. 3. The AC ports of the full-bridge inverters in the non-shared module are connected in series and then connected in series with the input terminal of the non-shared module through a power frequency voltage transformer, and the rest of the circuit structure is the same as the single-phase structure of the power network flexible controller topology shared by CHB-based modules. The three-phase topology has $12N_1+3N_2$ full-bridge converters, $3N_1$ high frequency transformers, and 1 power frequency transformer in total.

An example analysis is carried out taking the power network flexible controller topology shared by CHB-based modules as shown in FIG. 2 as an example.

Under normal operation, take a single phase as an example; according to FIG. 2, the relationship between KVL and KCL can be obtained from the analysis:

$$\begin{cases} U_1 + U_3 = U_{g1} - L_1 \frac{dI_1}{dt} \\ U_2 + U_3 = U_{g2} + L_2 \frac{dI_2}{dt} \\ I_1 = I_2 + I_3 \\ U_1 = \sum_{k=1}^{N_1} s_{1k} U_{dc1} \\ U_2 = \sum_{k=1}^{N_1} s_{2k} U_{dc2} \\ U_3 = \sum_{k=1}^{N-N_1} s_{3k} U_{dc2} \end{cases}$$

Where, most of the parameters are shown in FIG. 2, and $s_{jk}$ (j=1,2,3) is the switch function of each module.

According to the drawings, the technical scheme of the invention is described below in detail. The described embodiments are only a part of the embodiments of the invention, rather than all the embodiments.

Embodiment 1

The single-phase flexible controller topology is shown in FIG. 2. In this embodiment, it is assumed that the two ports of the topology are connected to two 3.6 kV AC networks with the same voltage amplitude and phase angle, and the connection function is verified through the simulation of the single-phase flexible controller topology. The main simulation parameters are shown in Table 1.

TABLE 1

Parameters of the flexible controller topology shared by modules in embodiment 1

| Parameter | Value | Parameter | Value |
|---|---|---|---|
| Transmission power P/kW | 100 | Output side switching frequency/kHz | 10 |
| Input side voltage $U_{g1}$/V | 3600 | Filter inductance on both sides L/mH | 10 |
| Input side phase angle $\theta_1$/° | 0 | Capacitor voltage of side A module $U_{dc}$/V | 750 |
| Input side switching frequency/kHz | 10 | Capacitor voltage of side B module $U_{DC}$/V | 750 |
| Output side load R/Ω | 64.88 | Number of full bridges of the non-shared module $N_1$ | 3 |
| Output side phase angle $\theta_2$/° | 0 | Number of full bridges of the shared module N-$N_1$ | 3 |

Figure 7:
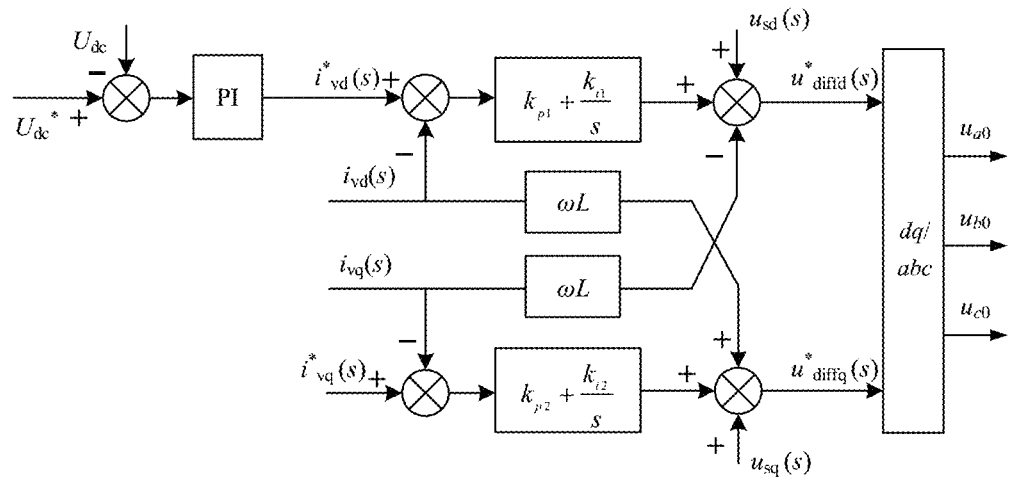
FIG. 7 is the control block diagram of the cascaded H-bridge in embodiment 1 of the invention.

In this simulation, side A is a single-phase AC power supply, and side B is an RLC load. As shown in FIG. 7, the modulation signals of the six full-bridge rectifiers 1 on side A are obtained from the dq voltage and current double closed-loop control. The average value of the single-phase DC side voltage is the outer loop, and the input AC current decoupled by dq is the inner loop. After a modulation wave is generated, the modulation signal of each full-bridge rectifier 1 is obtained by means of carrier phase-shifting.

Figure 8:
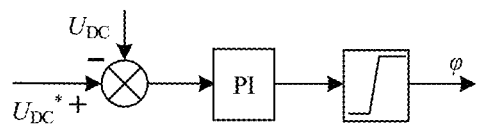
FIG. 8 is the control block diagram of the high frequency isolation level in embodiment 1 of the invention.

As shown in FIG. 8, the DAB control in the middle is that one of the isolation units is connected to the DC voltage on side B, the phase shift angle of DAB is directly obtained through PI regulation, and all DAB modulation signals are generated. The control mode of DAB ensures the stability of DC voltage on side B. The modulation signal of the full-bridge inverter 3 in the 3 non-shared modules on side B is the same as the modulation signal of the full-bridge rectifier 1 in the 3 non-shared modules on side A; therefore, it can be ensured that the voltage amplitude and phase angle at the front and rear ends are the same.

Figure 9:
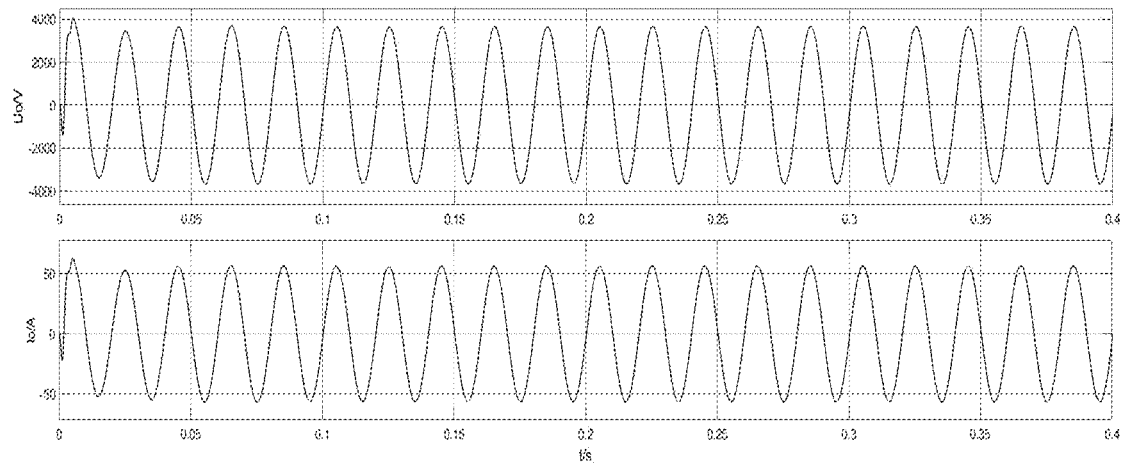
FIG. 9 is the waveform diagram of the output voltage and current in embodiment 1 of the invention.

The specific control block diagram of the CHB on side A is shown in FIG. 7, and the specific control block diagram of the middle high-frequency isolation unit is shown in FIG. 8. The simulated AC side output voltage and current are shown in FIG. 9.

Through simulation, it can be verified that the invention can realize the connection function when the voltage amplitude and phase angle at the two ports are the same, and that the invention can realize power transmission and power flow regulation.

Embodiment 2

Figure 10:
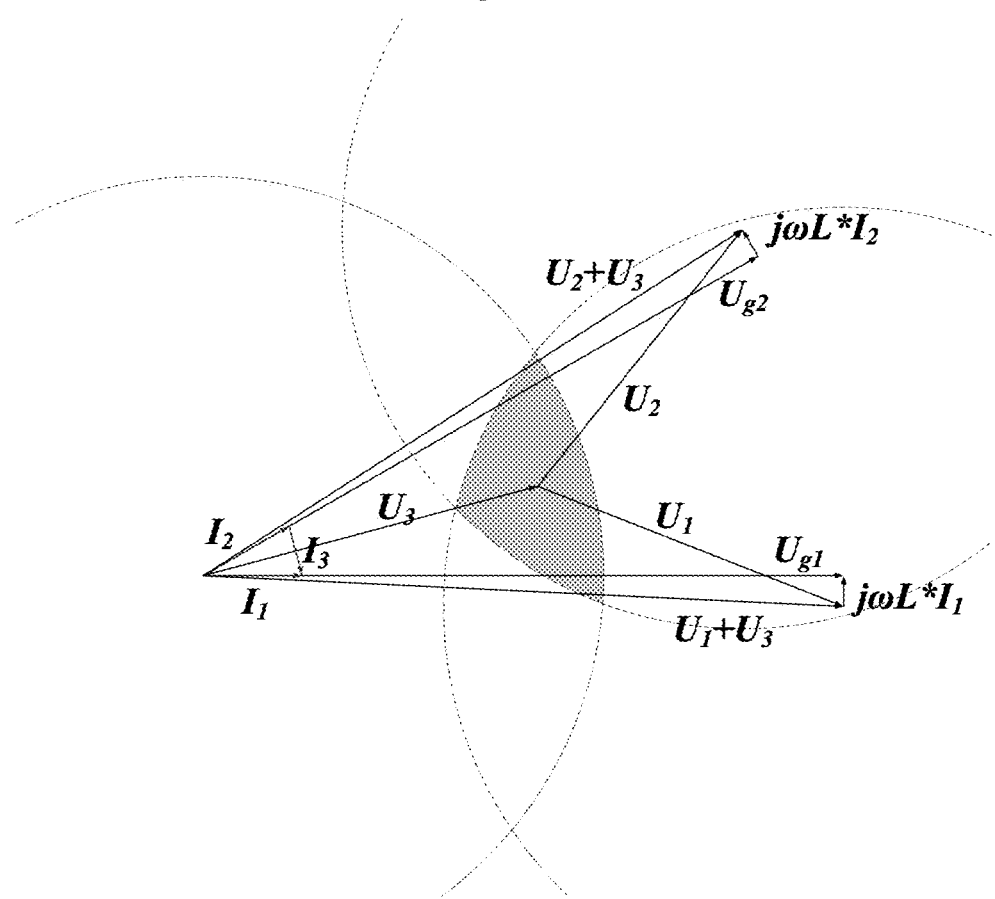
FIG. 10 is the circuit vector diagram of embodiment 2 of the invention.

The two ports are respectively connected to AC power network with voltage phase angles of 3.6 kV, 0° and 3.7 kV, 30°. The feasibility of the normal operation of the flexible controller topology is verified by means of a vector diagram when the power factor of the two ports of the flexible controller topology is 1. Assume that the specific parameters of the flexible controller topology are shown in Table 2. As shown in FIG. 10, assuming that the transmission power is determined and the voltage phase angle at the two ports is determined, the amplitude and phase angle of the AC currents $I_1$ and $I_2$ at the input and output ports can be calculated according to the transmission power, thereby calculating the amplitude and phase angle of $U_1+U_3$ and $U_2+U_3$.

The AC voltage corresponding to the H-bridge is smaller than the DC voltage corresponding to the H-bridge, so the maximum DC voltage amplitude $U_{dc1,2}$ corresponding to $U_1$ and $U_2$ is the product $N_1 \times U_{dc}$ of the number of unshared modules and the DC voltage of the capacitor. Similarly, the maximum DC voltage amplitude corresponding to side $U_3$ is $U_{dc3}=(N-N_1)\times U_{dc}$. The number of non-shared modules and shared modules can be determined by estimation, so as to obtain the maximum DC voltage amplitude on $U_1$, $U_2$ and $U_3$ sides. Draw a circle at the starting point of the vector $U_1+U_3$, $U_2+U_3$ with the maximum DC voltage amplitude $U_{dc3}$ corresponding to side $U_3$ as the radius, and then draw two circles at the end point of the vector $U_1+U_3$, $U_2+U_3$ with the maximum DC voltage amplitude $U_{dc1,2}$ corresponding to sides $U_1$ and $U_2$ respectively as the radius. The shaded part $U_1$, $U_2$ and $U_3$ where the three circles intersect is the area which can meet the operating conditions.

The shared module only sends reactive power, so the vector $U_3$ is perpendicular to $I_3$. The phase angle of $U_3$ can be determined by this method. Based on the area that meets the operating conditions in the previous step, the value range of $U_3$ can be obtained. The specific vector diagram is shown in FIG. 10.

The power transmitted by the non-shared module is $P_1=Re(\dot{U}_1 I_1^*)$ and the power transmitted by the shared module is $P_2=Re(\dot{U}_3 I_2^*)$. It can be seen that the larger the amplitude of $U_3$ the smaller the power transmitted through the non-shared module, and the greater the power transmitted through the shared module. Therefore, by maximizing the number of shared modules, the transmission efficiency of the system can be improved.

TABLE 2

Parameters of the flexible controller topology shared by modules in embodiment 2

| Parameter | Value | Parameter | Value |
|---|---|---|---|
| Transmission power P/kW | 100 | Filter inductance on both sides L/mH | 10 |
| Input side voltage $U_{g1}$/V | 3600 | Module capacitance $C_{dc}$/mF | 5 |
| Input side phase angle $\theta_1$/° | 0 | Capacitor voltage of module $U_{dc}$/V | 750 |
| Output side voltage $U_{g2}$/V | 3700 | Number of non-shared modules $N_1$ | 3 |
| Output side phase angle $\theta_2$/° | 30 | Number of shared modules $N-N_1$ | 3 |

In this application scenario, the invention's feasibility of connecting two distribution networks differing to some extent in voltage and amplitude has been verified using the vector diagram method, and it has been proved that the invention can carry out power transmission in this case. In addition, it can be obtained from the vector diagram that for different voltages at both ends, different functions can be realized by setting the number and ratio of shared modules and non-shared modules, and the DC voltage value.

The above-mentioned embodiments are merely examples to clearly illustrate the invention, and are not intended to limit the implementation modes. As far as a person of ordinary skill in the art is concerned, the person can also make other changes or modifications in different forms on the basis of the above description. It is unnecessary and impossible to enumerate all embodiments here, and the obvious changes or modifications derived thereof are still within the protection scope of the invention.

The invention claimed is:

1. A power network flexible closed-loop controller topology shared by modules, wherein each single-phase topology comprises:

an AC/AC (Alternating Current/Alternating Current) converter comprising $N_1$ CHB (Cascaded H-Bridge) modules, and an AC/DC (Alternating Current/Direct Current) module comprising $N-N_1$ full-bridge rectifiers;

AC (Alternating Current) input terminals of the $N_1$ CHB modules are connected in series to form an AC (Alternating Current) port on one side of the AC/AC converter, AC output terminals of the $N_1$ CHB modules are connected in series to form another AC port on an other side of the AC/AC converter, AC input terminals of the $N-N_1$ full-bridge rectifiers are connected in series to form an AC port of the AC/DC module, the AC port on the one side of the AC/AC converter is connected in series with the AC port of the AC/DC module and then connected to a first AC network, the another AC port on the other side of the AC/AC converter is connected in series with the AC port of the AC/DC module and then connected to a second AC network, and an AC incoming line and an AC outgoing line of three-phase topology are connected to the first and second AC networks in a star connection mode, wherein N and $N_1$ are positive integers and N is more than $N_1$.

2. The power network flexible closed-loop controller topology shared by modules according to claim 1, wherein the CHB module is a dual active bridge DC/DC converter, and the dual active bridge DC/DC converter comprises a full-bridge rectifier, a high frequency isolation unit, and a full-bridge inverter connected in sequence.

3. The power network flexible closed-loop controller topology shared by modules according to claim 1, wherein the power network flexible closed-loop controller topology also comprises a power frequency transformer, the another AC port on the other side of the AC/AC converter is connected in series with a primary coil of the power frequency transformer and then connected to the first AC network, and a secondary coil of the power frequency transformer is connected to the AC port of the AC/DC module.

4. The power network flexible closed-loop controller topology shared by modules according to claim 2, wherein the values of N and N1 are selected to maximize a DC link voltage between the full-bridge rectifier and the high-frequency isolation unit, another DC link voltage between the high-frequency isolation unit and the full-bridge inverter, and a DC voltage obtained after converting input voltage at the AC port of the AC/DC module.

5. The power network flexible closed-loop controller topology shared by modules according to claim 1, wherein the AC/AC converter is a topology with one input port and multiple output ports, and each AC outgoing line of the AC/AC converter and a ground wire form an output port of the power network flexible closed-loop controller topology.

6. The power network flexible closed-loop controller topology shared by modules according to claim 1, wherein an AC incoming line of the AC/AC converter and an AC outgoing line of the AC/DC module are both connected with a filter inductance.

7. The power network flexible closed-loop controller topology shared by modules according to claim 2, wherein the high-frequency isolation unit comprises two full-bridge converters and a high-frequency isolation transformer connected between the two full-bridge converters.

8. The power network flexible closed-loop controller topology shared by modules according to claim 2, wherein both a port connecting the high-frequency isolation unit with a DC side of the full-bridge rectifier, and a port connecting the high-frequency isolation unit with a DC side of the full-bridge inverter are connected with a filter capacitor.

\* \* \* \* \*